(12) United States Patent
Sakamoto

(10) Patent No.: US 7,865,611 B2
(45) Date of Patent: Jan. 4, 2011

(54) CONTENT DELIVERY METHOD AND COMMUNICATION TERMINAL APPARATUS

(75) Inventor: Takuya Sakamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 135 days.

(21) Appl. No.: 12/382,620

(22) Filed: Mar. 19, 2009

(65) Prior Publication Data
US 2009/0313330 A1      Dec. 17, 2009

(30) Foreign Application Priority Data
Jun. 13, 2008    (JP) .............................. 2008-155761

(51) Int. Cl.
*G06F 15/16* (2006.01)
(52) U.S. Cl. ........................ 709/232; 709/203; 709/217
(58) Field of Classification Search ......... 709/200–203, 709/217–233
See application file for complete search history.

(56) References Cited

U.S. PATENT DOCUMENTS

| | | | | |
|---|---|---|---|---|
| 5,706,281 | A * | 1/1998 | Hashimoto et al. | 370/252 |
| 6,003,045 | A * | 12/1999 | Freitas et al. | 1/1 |
| 6,018,780 | A * | 1/2000 | Fenchel | 710/105 |
| 6,105,029 | A * | 8/2000 | Maddalozzo et al. | 1/1 |
| 7,165,050 | B2 * | 1/2007 | Marking | 705/51 |
| 2002/0059167 | A1 * | 5/2002 | Sunada | 707/1 |
| 2003/0009579 | A1 * | 1/2003 | Kawai et al. | 709/231 |
| 2004/0078392 | A1 * | 4/2004 | Morita | 707/104.1 |
| 2005/0091395 | A1 * | 4/2005 | Harris et al. | 709/232 |
| 2006/0007947 | A1 | 1/2006 | Li et al. | |
| 2006/0064383 | A1 * | 3/2006 | Marking | 705/57 |
| 2006/0064386 | A1 * | 3/2006 | Marking | 705/59 |
| 2008/0010660 | A1 * | 1/2008 | Sumiyoshi | 725/105 |
| 2009/0204727 | A1 * | 8/2009 | Wang | 709/246 |

FOREIGN PATENT DOCUMENTS

JP       2006-25408       1/2006

* cited by examiner

*Primary Examiner*—Moustafa M Meky
(74) *Attorney, Agent, or Firm*—Staas & Halsey LLP

(57) ABSTRACT

A content delivery method and apparatus that can achieve stable streaming in a system that performs data exchange efficiently by dividing content into blocks and distributing them among a plurality of nodes. A receiving node transmits the playback start time of each block as delivery reservation request information to a corresponding one of delivery nodes. The corresponding delivery node receives the delivery reservation request information from the receiving node, determines delivery start time and delivery end time based at least on the delivery reservation request information and on reservation status and network bandwidth information, and transmits the delivery start time and delivery end time as delivery reservation result information to the receiving node. The receiving node receives the delivery reservation result information from the corresponding delivery node, and receives the block by requesting, in accordance with the delivery reservation result information, delivery of the block from the corresponding delivery node.

10 Claims, 11 Drawing Sheets

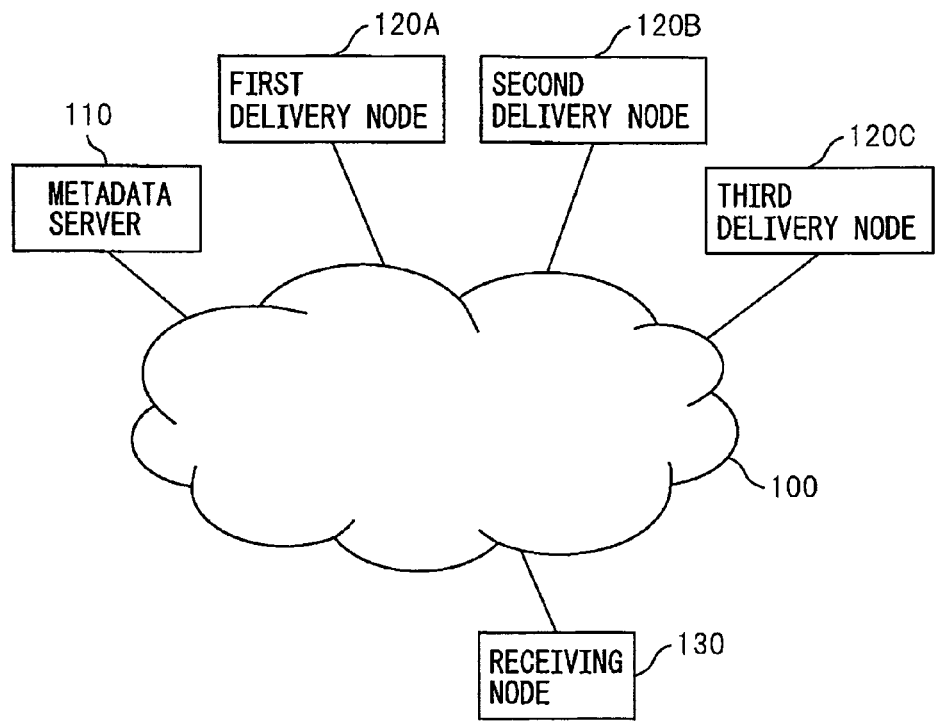
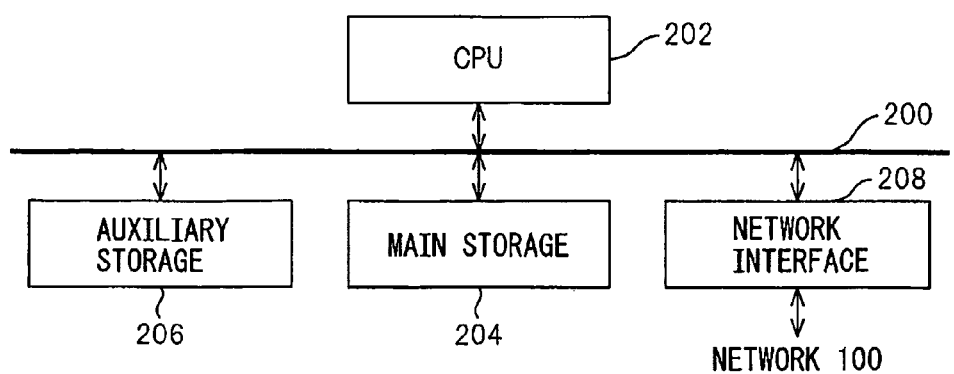

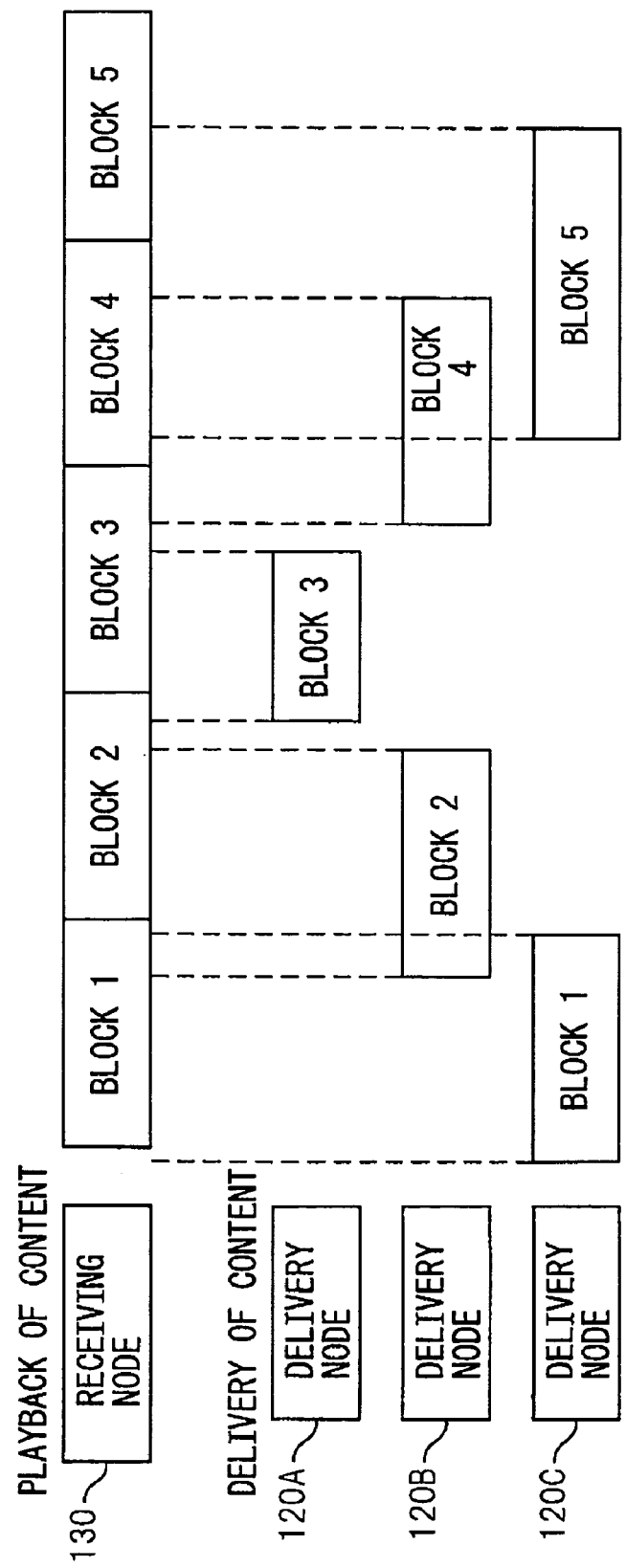

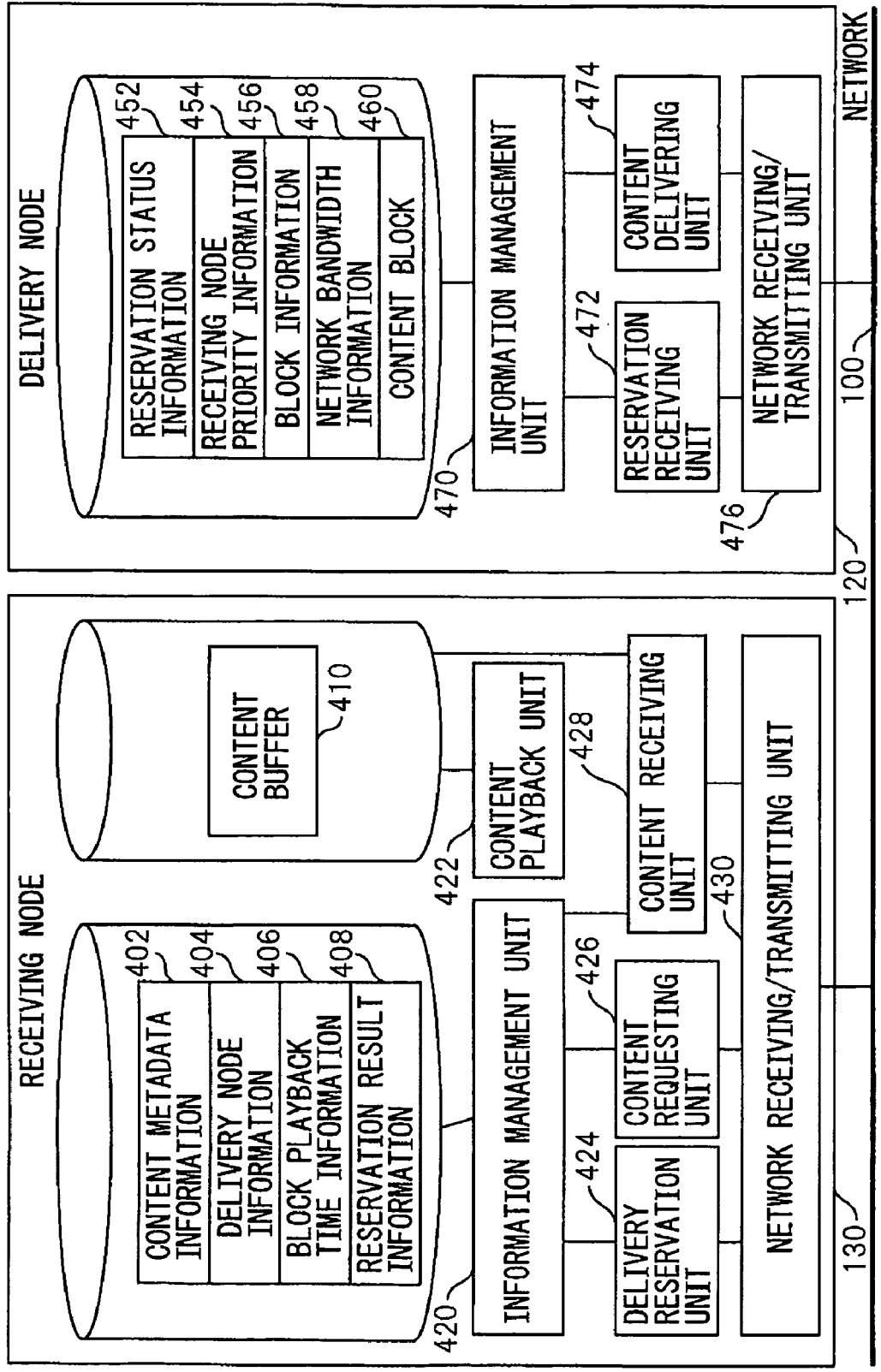

| BLOCK NUMBER | BLOCK ID | START TIME | END TIME |
|---|---|---|---|
| 1 | abc00001 | 00:00:00 | 00:01:00 |
| 2 | abc00002 | 00:01:00 | 00:02:00 |
| ⋮ | ⋮ | ⋮ | ⋮ |

| BLOCK ID | PLAYBACK START TIME | PLAYBACK END TIME |
|---|---|---|
| abc00001 | 2007/10/29 10:01:00 | 2007/10/29 10:02:00 |
| abc00002 | 2007/10/29 10:02:00 | 2007/10/29 10:03:00 |
| ⋮ | ⋮ | ⋮ |

| DELIVERY START TIME | DELIVERY NODE IP ADDRESS | BLOCK ID |
|---|---|---|
| 2007/10/29 10:00:00 | 192.168.0.100 | abc00001 |
| 2007/10/29 10:01:00 | 192.168.0.101 | abc00002 |
| ⋮ | ⋮ | ⋮ |

| DELIVERY START TIME | DELIVERY END TIME | RECEIVING NODE IP ADDRESS |
|---|---|---|
| 2007/10/29 10:02:00 | 2007/10/29 10:03:00 | 192.168.0.200 |
| 2007/10/29 10:03:00 | 2007/10/29 10:04:00 | 192.168.0.201 |
| ⋮ | ⋮ | ⋮ |

| RECEIVING NODE IP ADDRESS | PRIORITY |
|---|---|
| 192.168.0.200 | 1 |
| 192.168.0.201 | 2 |
| ⋮ | ⋮ |

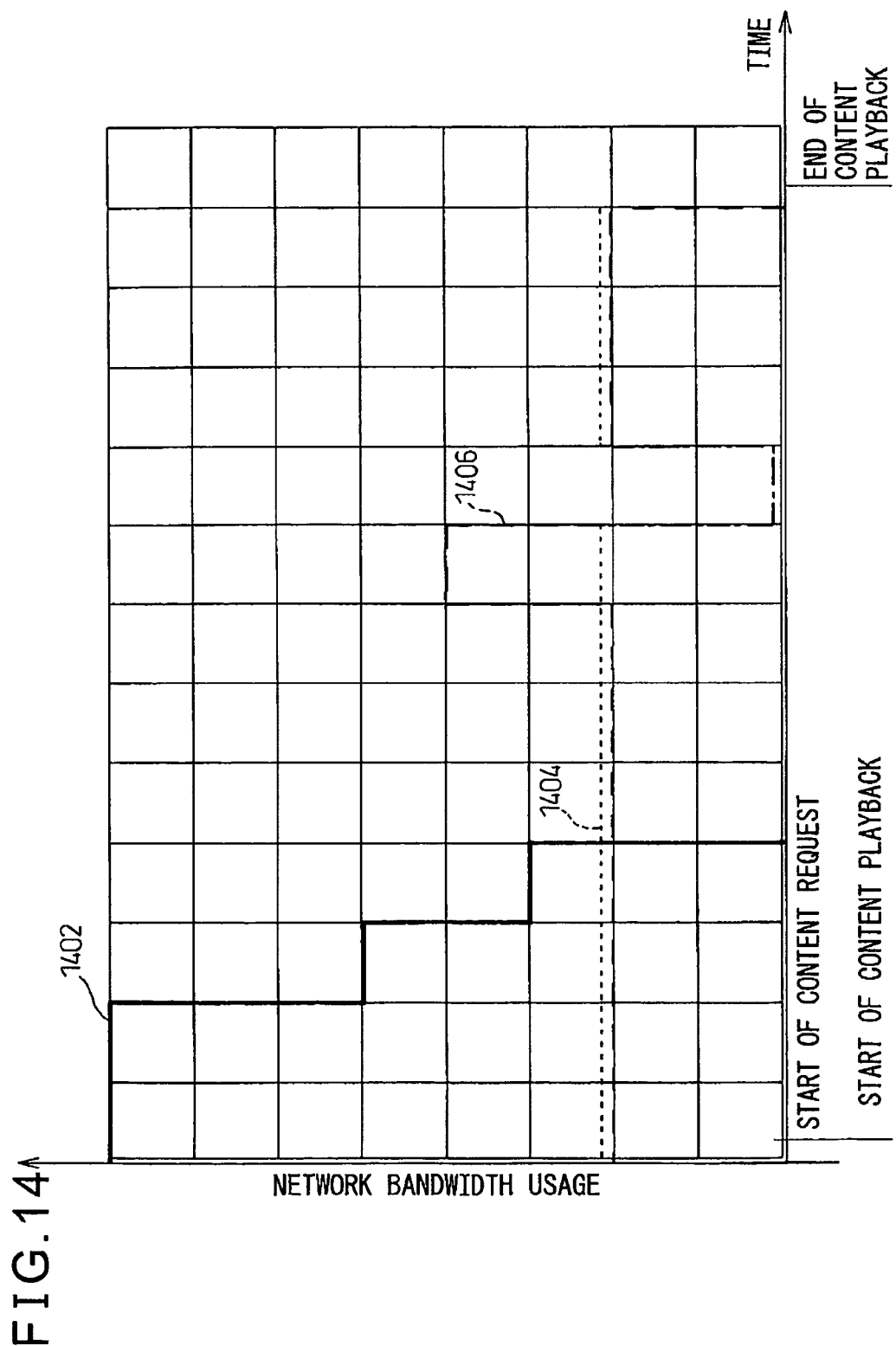

CONTENT DELIVERY METHOD AND COMMUNICATION TERMINAL APPARATUS

CROSS-REFERENCE TO RELATED APPLICATIONS

This application is based upon and claims the benefit of priority of the prior Japanese Patent Application No. 2008-155761, filed on Jun. 13, 2008, the entire contents of which are incorporated herein by reference.

FIELD

The embodiments disclosed herein are directed to a method for delivering content from at least one delivery node that holds a content block allocated thereto to a receiving node in a computer network in which data is exchanged between user nodes in a peer-to-peer system (hereinafter also called a P2P system) or the like, and a communication terminal apparatus that functions as the delivery node or the receiving node.

BACKGROUND

Content delivery services are becoming widespread. Many of such services are implemented using a mechanism in which a server delivers content by directly receiving a request from a client. This method, however, has the problem that the server load greatly increases as the number of clients (users) increases. In view of this, BitTorrent (a trademark of BitTorrent Incorporated), for example, which is a protocol for a file sharing system, a mechanism is implemented that reduces or eliminates the server load by dividing content into a plurality of blocks and distributing them among multiple user nodes.

In this method, the client (receiving server) checks with other user nodes (delivery nodes) to see if any one of them has a designated block, and acquires that block, and the client downloads the entire content by repeating this process for all the blocks. Fast downloading is achieved by receiving different blocks from a plurality of nodes at once. A method is also implemented that achieves efficient downloading by strategically distributing content blocks among user nodes, for example, in the case of frequently downloaded content, by distributing duplicate blocks among a number of user nodes (refer, for example, to Patent Document 1 given below).

While this method can achieve efficient and high-speed downloading, it requires a large network bandwidth. On the other hand, in the case of streaming, which unlike downloading, allows the user to play back the content as it is received, the receiving node needs to have the necessary data at the time of playback (i.e., the portion about to be played back). The receiving node need only have the data as it becomes necessary for playback, and need not necessarily acquire the data earlier than that. If the mechanism of downloading is directly applied to streaming, there can occur cases where the necessary data cannot be received in time, causing an interruption in playback, or where the delivery node uses the bandwidth by acquiring the data unnecessarily earlier, resulting in a reduction in the efficiency of delivery to other nodes.

Patent Document 1: Japanese Unexamined Patent Publication No. 2006-025408

SUMMARY

According to one aspect of the techniques disclosed herein, a content delivery method for delivering content from at least one delivery node that holds a block allocated thereto from among a plurality of blocks constituting the content to a receiving node in a computer network, includes: the receiving node transmitting playback start time of each block as delivery reservation request information to a corresponding one of the delivery nodes; the corresponding delivery node receiving the delivery reservation request information from the receiving node; the corresponding delivery node determining delivery start time and delivery end time based at least on the delivery reservation request information and on reservation status and network bandwidth information; the corresponding delivery node transmitting the delivery start time and the delivery end time as delivery reservation result information to the receiving node; the receiving node receiving the delivery reservation result information from the corresponding delivery node; and the receiving node receiving the block by requesting, in accordance with the delivery reservation result information, delivery of the block from the corresponding delivery node.

Further, according to another aspect of the techniques disclosed herein, there are provided, in the above method, a communication terminal apparatus that functions as the delivery node or the receiving node, and a recording medium having a program recorded thereon for causing a computer to function as the communication terminal apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a block diagram depicting an example of a communication system on a computer network to which the content delivery method of the present invention is applied.

FIG. 2 is a diagram depicting in simplified form the hardware configuration of a personal computer as a metadata server, a delivery node, or a receiving node.

FIG. 3 is a diagram illustrating in a time sequence the way the receiving node acquires content blocks from delivery nodes and plays back the content blocks.

FIG. 4 is a diagram depicting the functional configuration of the delivery node and the receiving node.

FIG. 7 is a diagram depicting an example of block playback time information maintained in the receiving node.

FIG. 8 is a diagram depicting an example of reservation result information maintained in the receiving node.

FIG. 10 is a diagram depicting an example of reservation status information maintained in the delivery node.

FIG. 11 is a diagram depicting an example of receiving node priority information maintained in the delivery node.

FIG. 14 is a diagram explaining how the network bandwidth usage changes over time according to the content delivery method disclosed herein, for comparison with the prior art.

DESCRIPTION OF EMBODIMENTS

Figure 5:
FIG. 5 is a diagram depicting an example of content metadata information maintained in the receiving node.

FIG. 1 is a block diagram depicting an example of a communication system on a computer network in which the content delivery method of the present invention is implemented. This system performs peer-to-peer (P2P) communications. In a P2P system, unlike a client server system, any particular node, i.e., communication terminal apparatus, can act as a content receiving node or as a content delivery node. For convenience, the node that delivers content is called the delivery node, and the node that receives the content is called the receiving node.

In FIG. 1, reference numeral 110 is a metadata server, 120A, 120B, and 120C are first, second, and third delivery nodes, respectively (any delivery node is designated by reference numeral 120), and 130 is a receiving node. These apparatuses are usually personal computers (hereinafter sometimes designated "PCs"), and are interconnected via a network 100. The network 100 is, for example, the Internet. These apparatuses are not necessarily limited to PCs, but can be household electrical appliances that can connect to the network.

FIG. 2 is a diagram depicting in simplified form the hardware configuration of the personal computer (PC) as the metadata server 110, delivery node 120, or receiving node 130. The PC comprises a central processing unit (CPU) 202, a main storage 204, an auxiliary (external) storage 206, and a network interface 208. The CPU 202 is connected to the other component elements via a bus 200, and implements the function of the receiving node or delivery node by executing the program loaded into the main storage 204.

FIG. 3 is a diagram illustrating in a time sequence the way the receiving node 130 acquires content blocks from the delivery nodes 120A, 120B, and 120C and plays back the content blocks. In the illustrated example, the content consists of five blocks. To the receiving node 130, the delivery node 12A delivers block 3, the delivery node 120B delivers blocks 2 and 4, and the delivery node 120C delivers block 1 and block 5.

As depicted in FIG. 3, the blocks 1 to 5 are delivered to the receiving node 130 from the respective delivery nodes 120A, 120B, and 120C at appropriate times by considering that the receiving node 130 need only receive each block as it becomes necessary for playback. That is, each block is received just before it becomes necessary for playback. The time that each block is cached at the receiving node 130 before playback is thus reduced. The receiving node 130 starts to acquire each block a given time before playing back the block, by considering the delivery delay time and required delivery time (the time required for delivery) predicted based on the capacity of the delivery node and the network bandwidth.

In the example depicted in FIG. 3, the time required to deliver the block 1 from the delivery node 120C is the same as the time required to play back the same block at the receiving node 130. For the block 3, on the other hand, the required delivery time is shorter than the required playback time. For the block 5, the required delivery time is longer than the required playback time. A method for achieving stable streaming while equalizing the network bandwidth usage as described above will be explained below.

FIG. 4 is a diagram depicting the functional configuration of the delivery node 120 and the receiving node 130. As depicted, the receiving node 130 contains, in its auxiliary storage, content metadata information 402, delivery node information 404, block playback time information 406, reservation result information 408, and a content buffer 410.

Further, the receiving node 130 includes, as its functional units, an information management unit 420, a content playback unit 422, a delivery reservation unit 424, a content requesting unit 426, a content receiving unit 428, and a network receiving/transmitting unit 430.

On the other hand, the delivery node 120 contains, in its auxiliary storage, reservation status information 452, receiving node priority information 454, block information 456, network bandwidth information 458, and a content block 460. Further, the deliver node 120 includes, as its functional units, an information management unit 470, a reservation receiving unit 472, a content delivering unit 474, and a network receiving/transmitting unit 476.

In the present embodiment, the content is divided into a plurality of blocks, which are distributed among a plurality of nodes. This offers the advantage that the access does not concentrate on a particular node, unlike the case where a single node has the whole content. Each delivery node may have only a portion of the content or may have the whole content. If the whole content is to be played back, the receiving node has to gather the blocks distributed among the plurality of delivery nodes.

FIG. 5 depicts an example of the content metadata information 402 maintained in the receiving node 130. As depicted, the receiving node 130 has, as the metadata 402, information for uniquely identifying each block of the content (block ID) and information for identifying the position of the block within the content, that is, the start time and end time of the block (as measured relative to the beginning of the content). The receiving node 130 has, in addition to the content metadata information 402, the delivery node information 404 that indicates the IP address of each delivery node.

To acquire the delivery node information 404, the receiving node 130 accesses a server holding the metadata, that is, the metadata server 110 depicted in FIG. 1. The delivery node information 404 is acquired by communicating information such as depicted below, for example, in the form of an XML (Extensible Markup Language) document.

```
<?ml version="1.0"?>
<block id="abc00001">
<ip>192.168.100.1</ip>
<ip>192.168.100.2</ip>
</block>
<block id="abc00002">
<ip>192.168.100.2</ip> (the rest omitted)
```

The above example depicts that the block whose ID is abc00001 is held at a node having an IP address 192.168.100.1 and a node having an IP address 192.168.100.2. Of course, the communication information is not limited to the above example, but may include not only the IP addresses but also port information or may be transmitted in various ways, for example, by encrypting the information.

The receiving node 130 also acquires the content metadata information 402 from the metadata server 110 by means of communication. For example, the following communication is performed by extending the communication used to acquire the delivery node information 404.

```
<?ml version="1.0"?>
<block id="abc00001" starttime="00:00:00"
endtime="00:01:00">
<ip>192.168.100.1</ip>
```

-continued

```
<ip>192.168.100.2</ip>
</block>
<block id="abc00002" starttime="00:01:00"
endtime="00:02:00">
<ip>192.168.100.2</ip> (the rest omitted)
```

The above example depicts that the block whose ID is abc00001 is the data to be played back from the time when the content begins, until one minute elapses from the beginning of the content, and that the block whose ID is abc00002 is the data to be played back from the time when one minutes has elapsed from the beginning of the content, until two minute elapses from the beginning of the content. In the present embodiment, after acquiring the metadata information 402 and the delivery node information 404 as described above, the receiving node 130 receives a content playback request from the user. Alternatively, the receiving node 130 may be configured to acquire these pieces of information after receiving a user request.

Figure 6:
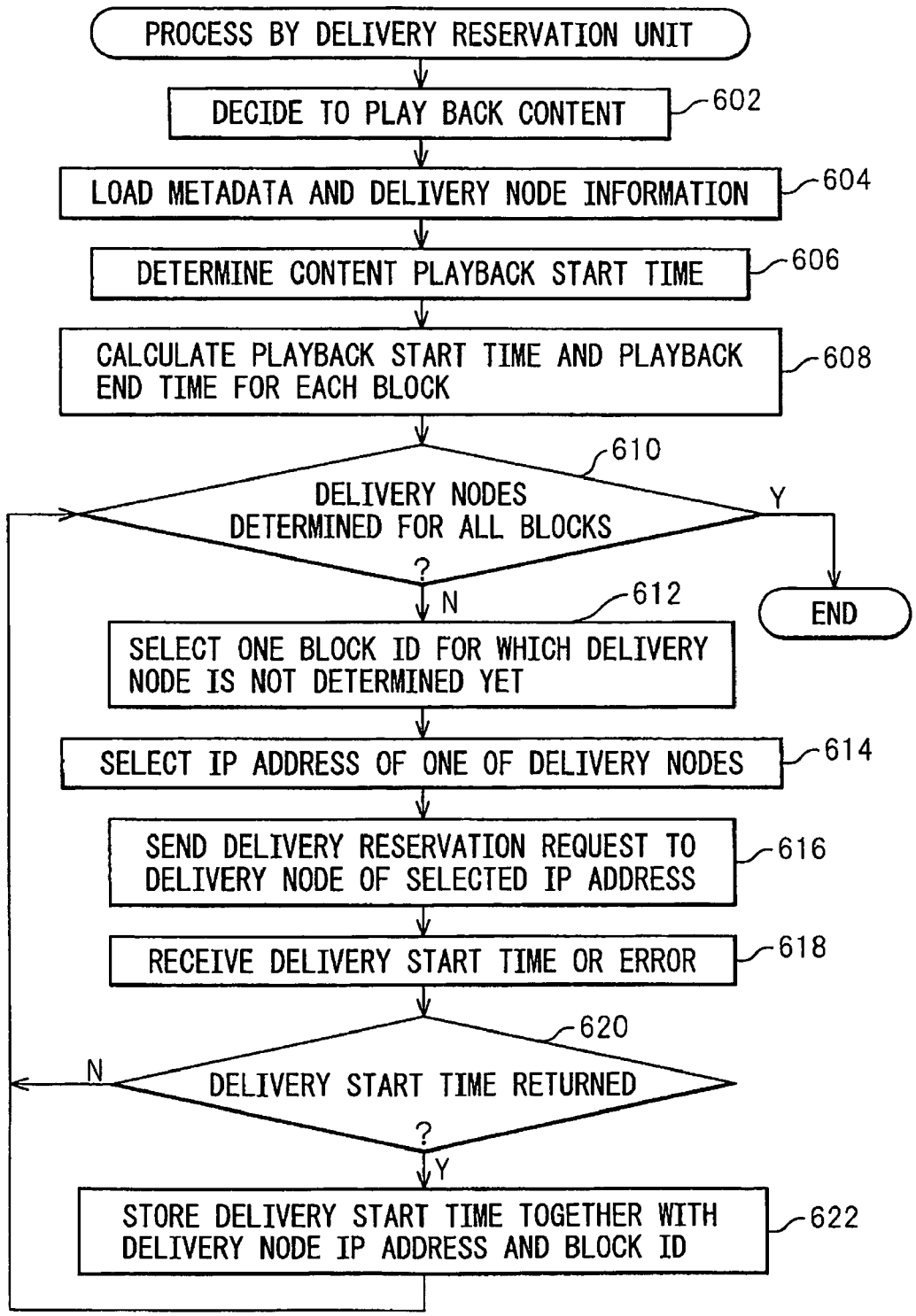
FIG. 6 is a flowchart illustrating the process performed by a delivery reservation unit in the receiving node.

FIG. 6 is a flowchart illustrating the process performed by the delivery reservation unit 424 in the receiving node 130. First, the delivery reservation unit 424 decides to play back content in response to an instruction from the user (step 602). Alternatively, provisions may be made to play back content in an automatic manner, not by responding to an instruction from the user.

Next, the delivery reservation unit 424 retrieves the metadata information 402 and delivery node information 404 associated with that content from the auxiliary storage via the information management unit 420, and loads them into the main storage (step 604).

Next, the delivery reservation unit 424 determines the playback start time of the content (step 606). The start time is calculated by adding a prescribed time appropriate to the number of content blocks and the number of delivery nodes to the time at which the user pressed a button or the like to play back the content. The prescribed time is calculated by "(time required for reservation)×(number of delivery nodes)×(number of blocks)." The time required for reservation is an estimated value, and the other values are acquired from the metadata information 402 and the delivery node information 404. For example, if the time required for reservation is 0.1 second, the number of delivery nodes is 10, and the number of content blocks is 60, then the prescribed time is given as 0.1×10× 60=60 seconds. Accordingly, if the button was pressed at 10:00:00 on Oct. 29, 2007, the playback start time is 10:01:00 on Oct. 29, 2007.

Based on the metadata information 402 and the thus determined content playback start time, the delivery reservation unit 424 calculates the necessary times (block playback start time and block playback end time) for each block, and stores them as the block playback time information 406 (step 608). FIG. 7 depicts an example of the block playback time information 406.

Thereafter, the delivery reservation unit 424 proceeds to make delivery reservations with the respective delivery nodes 120. First, the delivery reservation unit 424 checks whether the delivery nodes have been determined for all the blocks (step 610) and, if so, the process is terminated. Initially, the process proceeds to the next step.

If there is any block for which the delivery node is not determined yet, the delivery reservation unit 424 selects the block ID of the block for which the delivery node is not determined yet (step 612).

Next, the delivery reservation unit 424 selects the IP address of one of the delivery nodes that can deliver the block identified by the selected block ID (step 614). For example, if two delivery nodes "192.168.0.1" and "192.168.0.2" have the block "abc00001", as in the earlier described example, first the node "192.168.0.1" is selected. If a reservation request has previously been made to the node "192.168.0.1", but has failed, then node "192.168.0.2" is selected.

Next, the delivery reservation unit 424 sends, via the network transmitting/receiving unit 430, a delivery reservation request to the delivery node of the thus selected IP address (step 616). The reservation request is made by sending the block ID and the block playback start time and end time based on the block playback time information 406. For example, the reservation request communication data to the delivery node "192.168.0.1" is as follows:

```
<?ml version="1.0"?>
<block action="reserve" id="abc00001"
playstarttime="2007/10/29 10:01:00"
playendtime=="2007/10/29 10:02:00"/>
```

Then, the delivery reservation unit 424 receives the delivery start time as the reservation result from the requested delivery node, or an error if the reservation has failed (step 618). For example, the following response data is returned as the reservation result indicating the delivery start time "2007/ 10/29 10:00:30" for the block "abc00001".

```
<?ml version="1.0"?>
<block action="reserved" id="abc00001"
sendstarttime="2007/10/29 10:00:30"/>
```

Next, the delivery reservation unit 424 checks whether the delivery start time has been returned from the requested delivery node or an error has been returned from it (step 620). If an error has been returned, the delivery reservation unit 424 returns to step 610.

On the other hand, if the delivery start time has been returned, the delivery reservation unit 424 stores the delivery start time together with the delivery node IP address and block ID as the reservation result information 408 (step 622). FIG. 8 depicts an example of the reservation result information 408. Then, the delivery reservation unit 424 returns to step 610.

In this way, the delivery reservation unit 424 repeats the delivery reservation request process for each block of the content until a node that can deliver the block is found or until no such node is found. When the reservations have been made successfully for all the blocks, the delivery reservation unit 424 terminates the reservation process. If any reservation has failed, that is, if an error has been returned for any one of the blocks from all the requested delivery nodes, it is difficult to play back the content at the moment. Therefore, the delivery reservation unit 424 produces a wait message, and requests the user to retry or retries after waiting for a given time.

Figure 9:
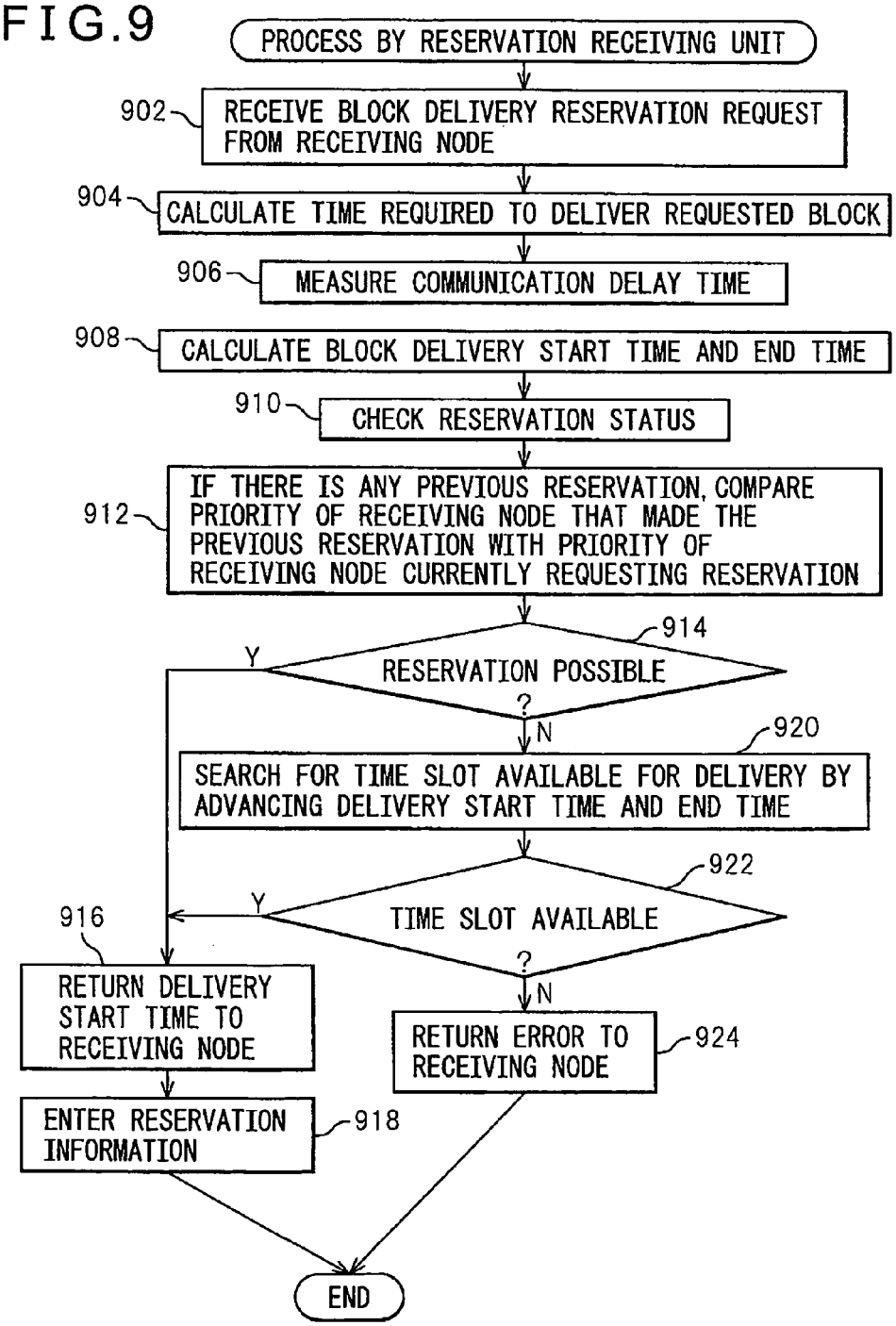
FIG. 9 is a flowchart illustrating the process performed by a reservation receiving unit in the delivery node.

FIG. 9 is a flowchart illustrating the process performed by the reservation receiving unit 472 in the delivery node 120. First, the reservation receiving unit 472 receives the block delivery reservation request (block ID, block playback start time, and block playback end time) from the receiving node 130 via the network transmitting/receiving unit 476 (step 902).

Next, the reservation receiving unit 472 calculates the time required to deliver the requested block (required delivery time) (step 904). The required time is calculated by dividing the size of the block by the network bandwidth as depicted by the following equation:

Required delivery time=Block size/Network bandwidth

The block size and the network bandwidth are acquired by accessing the block information 456 and the network bandwidth information 458, respectively, via the information management unit 470. The network bandwidth is measured by a conventional method, for example, by transferring prescribed data to and from a server on the Internet. The size of the block can be easily obtained, since the delivery node itself has the block.

Next, the reservation receiving unit 472 measures the communication delay time between the delivery node 120 and the receiving node 130 (step 906). The measurement is made, for example, by sending "ping" (a commonly used command to verify whether a packet is correctly received and a response is returned) from the delivery node to the receiving node and by measuring the response time.

Next, the reservation receiving unit 472 calculates the delivery start time and delivery end time of the block (step 908). When the relation "(playback end time)−(required delivery time)−(communication delay time)≦(playback start time)" holds, the playback start time is given as (Delivery start time)=(Playback end time)−(Required delivery time)−(Communication delay time)

On the other hand, when the relation "(playback end time)−(required delivery time)−(communication delay time)>(playback start time)" holds, the playback start time is given as (Delivery start time)=(Playback start time)−(Communication delay time)

The delivery end time is given as (Delivery end time)=(Delivery start time)+(Required delivery time)

Here, the delivery start time and delivery end time of the block may be determined based only on the required delivery time or on the communication delay time.

Next, the reservation receiving unit 472 checks the most up-to-date reservation status information 452 via the information management unit 470 (step 910). As depicted in FIG. 10, the reservation status information 452 is a collection of records each comprising delivery start time, delivery end time, and receiving node IP address.

If the calculated delivery time clashes with the reservation already made by some other receiving node, the reservation receiving unit 472 refers to the receiving node priority information 454 and compares the priority of that other receiving node with the priority of the receiving node currently requesting the reservation (step 912). As depicted in FIG. 11, the receiving node priority information 454 defines priority for each IP address. In a P2P system, provisions are often made to give higher priority to a node requesting a larger amount of data for delivery. By considering this, the present embodiment allocates priorities to the respective nodes, and when a reservation request is received from a higher priority node, the previously accepted reservation is invalidated, and the new reservation request is accepted.

Next, based on the results of steps 910 and 912, i.e., the reservation status and the receiving node priority, the reservation receiving unit 472 determines whether delivery of the requested block can be reserved or not (step 914). If the reservation is possible, the reservation receiving unit 472 returns the delivery start time as the reservation result to the receiving node 130 (step 916) and enters the new reservation information into the reservation status information 452 (step 918), after which the process is terminated.

However, if it is determined in step 914 that the reservation is not possible, it is determined whether the requested block can be delivered in an unreserved time slot by advancing the delivery start time and delivery end time, i.e., a search is made for a time slot available for delivery (step 920). If such a time slot is available for delivery of the requested block, the reservation receiving unit 472 proceeds to step 916. On the other hand, if such a time slot is not available, the reservation receiving unit 472 returns an error to the receiving node 130 (step 924), after which the process is terminated.

Figure 12:
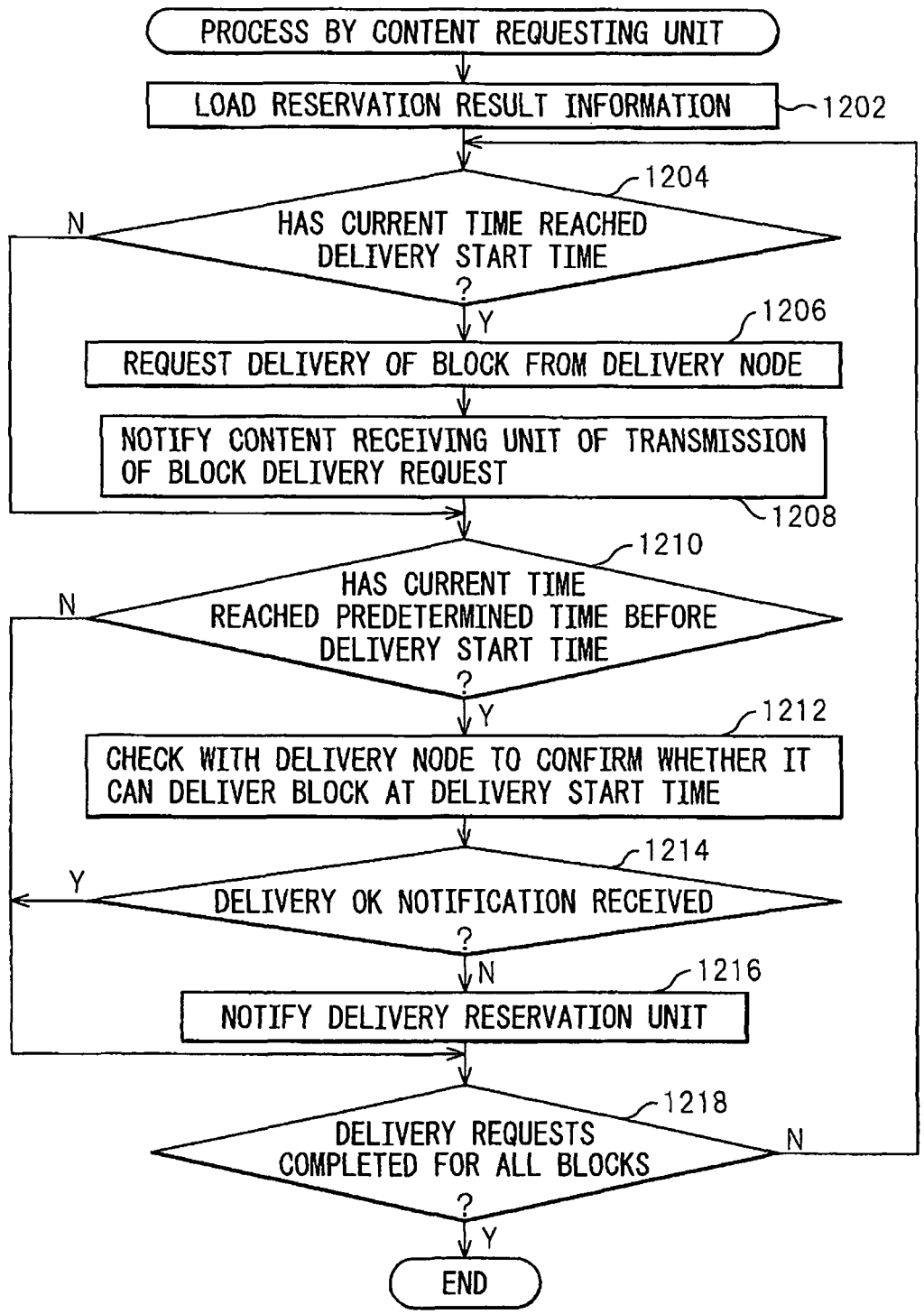
FIG. 12 is a flowchart illustrating the process performed by a content requesting unit in the receiving node.

FIG. 12 is a flowchart illustrating the process performed by the content requesting unit 426 in the receiving node 130. First, the content requesting unit 426 retrieves the reservation result information 408 from the auxiliary storage via the information management unit 420, and loads it into the main storage (step 1202).

Next, the content requesting unit 426 checks whether the current time has reached any one of the delivery start times stored in the reservation result information 408 (step 1204). If the current time has reached the delivery start time, the content requesting unit 426 requests the corresponding delivery node IP address for delivery of the block (step 1206), and notifies the content receiving unit 428 that the block delivery request has been made (step 1208).

Further, the content requesting unit 426 checks whether the current time has reached a given time before (for example, one minute before) any one of the delivery start times (step 1210). If the result of the check is YES, the content requesting unit 426 checks with the corresponding delivery node 120 to confirm whether it can deliver the block at the reserved delivery start time (step 1212). This is because, after returning the delivery start time, the delivery node may become unable to deliver the block, for example, because power is turned off to the delivery node. For this confirmation, data such as depicted below is sent, and the response is checked.

```
<?ml version="1.0"?>
<block action="confirm" id="abc00001"
    sendtime="2007/10/29 10:00:30"/>
```

If an error is returned or the communication has failed, the content requesting unit 426 notifies the delivery reservation unit 424 accordingly (steps 1214 and 1216). The delivery reservation unit 424 then makes a reservation for that particular block over again by repeating the process starting from step 612 (FIG. 6).

The content requesting unit 426 repeats the above steps until the delivery requests are completed for all the blocks (step 1218). The confirmation as to whether the block can be delivered at the reserved delivery start time may be made periodically at fixed intervals of time, rather than waiting until the given time before the delivery start time arrives.

Figure 13:
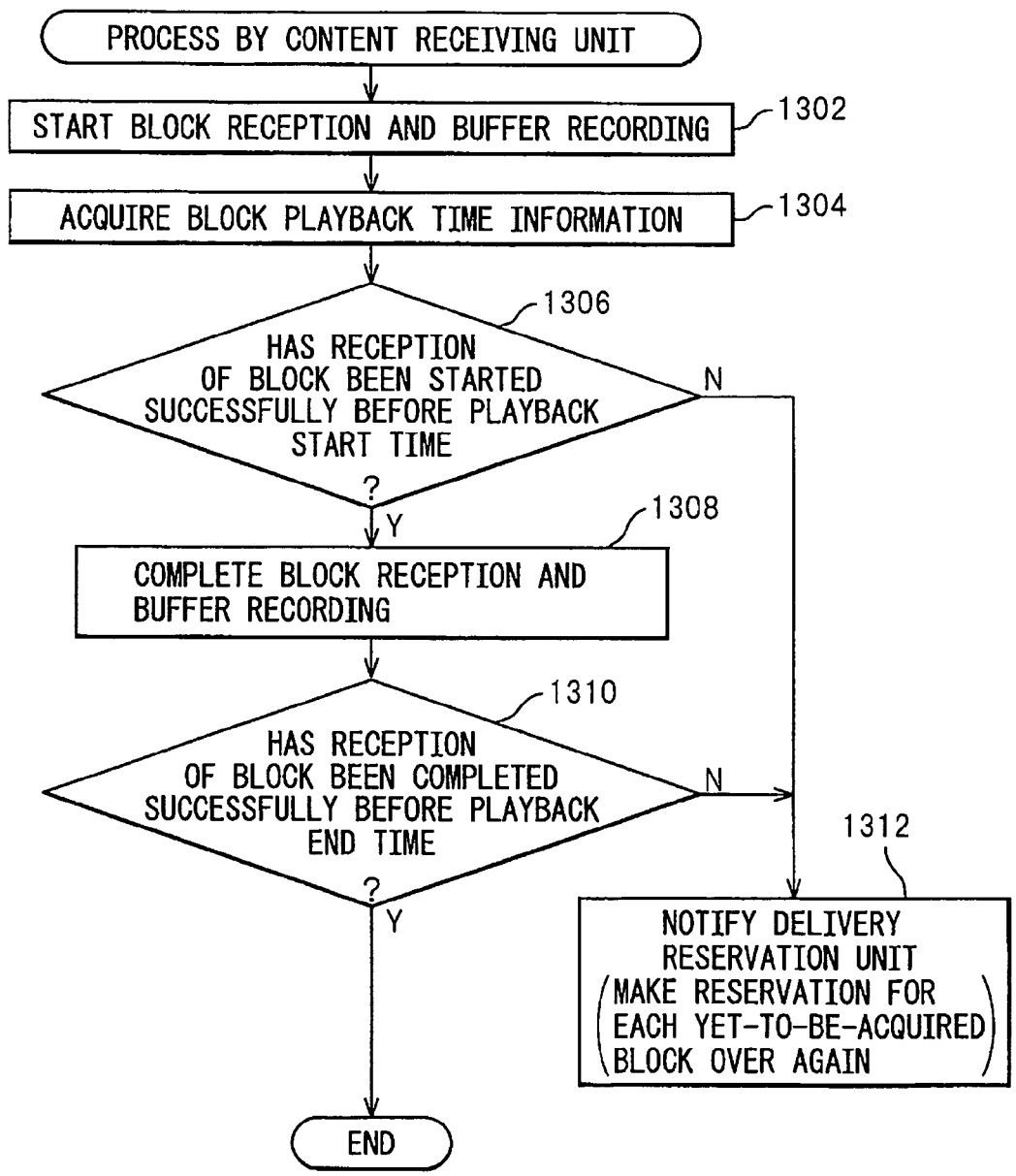
FIG. 13 is a flowchart illustrating the process performed by a content receiving unit in the receiving node.

FIG. 13 is a flowchart illustrating the process performed by the content receiving unit 428 in the receiving node 130. First, the content receiving unit 428, in response to the notification from the content requesting unit 426, starts to receive the block from the delivery node 120 via the network transmitting/receiving unit 430 and record it in the content buffer 410

(step 1302). The content block recorded here is played back by the ordinary stream playback operation of the content playback unit 422.

Next, the content receiving unit 428 acquires the block playback time information 406 (block playback start time and block playback end time) for the block via the information management unit 420. Then, the content receiving unit 428 checks whether the reception of the block has been started successfully before the playback start time (step 1306). If the reception of the block has been started successfully as scheduled, the content receiving unit 428 completes the reception of the block and the recording of the block into the buffer (step 1308), and then checks whether the reception of the block has been completed successfully before the playback end time (step 1310).

If it has not been possible to start the reception of the block before the playback start time, or it has not been possible to complete the reception of the block before the playback end time, the content receiving unit 428 notifies the delivery reservation unit 424 accordingly (step 1312). The delivery reservation unit 424 then makes a reservation for each yet-to-be-acquired block over again by repeating the process starting from step 612 (FIG. 6).

For example, when the network bandwidth becomes insufficient for any reason, such as the communication condition being affected as a result of data transfer to and from another node, the requested block may not be able to be delivered in time for playback. This causes a delay in playback, resulting in a situation where the reception of the succeeding block can be delayed from the scheduled time, or conversely, depending on the network environment, there may arise a need to receive it earlier than the scheduled time. In the present embodiment, if any deviation from the schedule occurs, the reservation process is performed once again, making it possible to exit such a situation.

FIG. 14 is a diagram explaining how the network bandwidth usage changes over time according to the content delivery method disclosed herein, for comparison with the prior art. Line 1402 depicts the change of the network bandwidth usage over time according to a first prior art method in which a plurality of content blocks are quickly and simultaneously downloaded for caching. According to this prior art method, the network bandwidth usage becomes uneven since it is attempted to acquire the content quickly.

On the other hand, line 1404 depicts the change of the network bandwidth usage over time according to a second prior-art method which acquires each block by polling the corresponding delivery node as the playback time approaches. According to this prior art method, if the delivery node that holds the block is in the process of delivering data to some other node, for example, the delivery node may become unable to deliver the requested block; in that case, the playback is interrupted.

In contrast, line 1406 depicts the change of the network bandwidth usage over time according to the technique disclosed herein. According to the technique disclosed herein, the delivery reservation unit 424 checks in advance whether the streaming of the content is possible or not. Furthermore, the delivery time can be shifted by using the reservation receiving unit 472. As a result, each block can be acquired in a stable manner as it becomes necessary. Further, when there are a plurality of receiving nodes, since the network bandwidth usage is distributed, network congestion can be avoided.

According to the method and apparatus disclosed herein, stable streaming can be achieved by the reservation process as it serves to reduce the likelihood of causing an interruption or becoming unable to acquire a portion of the content during streaming. Prior art methods for achieving stable streaming include a method that caches all the content blocks before playing back the whole content and a method that acquires the blocks as fast as possible by receiving the blocks from a plurality of delivery nodes at once and plays back the content by caching the thus acquired blocks. Compared with these prior art methods, the method and apparatus disclosed herein achieves stable streaming by acquiring each block as it becomes necessary. As a result, when there are a plurality of receiving nodes, since the network bandwidth usage is distributed, network congestion can be avoided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiments of the present invention has been described in detail, it should be understood that the various changes, substitutions, and alternations could be made hereto without departing from the spirit and scope of the invention.

What is claimed is:

1. A content delivery method for delivering content from at least one delivery node that holds a block allocated thereto from among a plurality of blocks constituting said content to a receiving node in a computer network, said method comprising:

said receiving node transmitting playback start time of each block as delivery reservation request information to a corresponding one of said delivery nodes;

said corresponding delivery node receiving said delivery reservation request information from said receiving node;

said corresponding delivery node determining delivery start time and delivery end time based at least on said delivery reservation request information and on reservation status and network bandwidth information;

said corresponding delivery node transmitting said delivery start time and said delivery end time as delivery reservation result information to said receiving node;

said receiving node receiving said delivery reservation result information from said corresponding delivery node; and said receiving node receiving said block by requesting, in accordance with said delivery reservation result information, delivery of said block from said corresponding delivery node.

2. A communication system on a computer network which includes at least one delivery node that holds a block allocated thereto from among a plurality of blocks constituting a piece of content and a receiving node which receives said content, wherein said receiving node comprises:

a reservation request transmitting unit which transmits playback start time of each block as delivery reservation request information to a corresponding one of said delivery nodes, and said corresponding delivery node comprises:

a reservation request receiving unit which receives said delivery reservation request information from said receiving node;

a delivery time determining unit which determines delivery start time and delivery end time based at least on said delivery reservation request information and on reservation status and network bandwidth information; and a reservation result transmitting unit which transmits said delivery start time and said delivery end time as delivery reservation result information to said receiving node, and wherein said receiving node further comprises:

a reservation result receiving unit which receives said delivery reservation result information from said corresponding delivery node; and a block receiving unit which receives said block by requesting, in accordance with said delivery reservation result information, delivery of said block from said corresponding delivery node.

3. A communication terminal apparatus which functions in a computer network as a receiving node that receives content from at least one delivery node that holds a block allocated thereto from among a plurality of blocks constituting said content, said apparatus comprising:

a reservation request transmitting unit which transmits playback start time of each block as delivery reservation request information to a corresponding one of said delivery nodes;

a reservation result receiving unit which receives, from said corresponding delivery node, delivery reservation result information carrying delivery start time and delivery end time that said corresponding delivery node has determined based at least on said delivery reservation request information and on reservation status and network bandwidth information; and a block receiving unit which receives said block by requesting, in accordance with said delivery reservation result information, delivery of said block from said corresponding delivery node.

4. A communication terminal apparatus as claimed in claim 3, wherein a confirmation request is sent to said corresponding delivery node periodically at fixed intervals of time, or when a given time before said delivery start time has arrived, to confirm whether said corresponding delivery node can deliver said block in accordance with said delivery reservation result information, and wherein if a response confirming the delivery of said block has not been obtained, said reservation request transmitting unit, said reservation result receiving unit, and said block receiving unit are operated once again to request delivery of said block from another delivery node.

5. A communication terminal apparatus as claimed in claim 3, wherein the reception of said block is started or ended at a time later than said delivery start time or said delivery end time, said reservation request transmitting unit, said reservation result receiving unit, and said block receiving unit are operated for reception of each yet-to-be-received block.

6. A communication terminal apparatus which functions in a computer network as a deliver node that that holds a block allocated thereto from among a plurality of blocks constituting a piece of content and that delivers said block to a receiving node, said apparatus comprising:

a reservation request receiving unit which receives playback start time of said block as delivery reservation request information from said receiving node;

a delivery time determining unit which determines delivery start time and delivery end time based at least on said delivery reservation request information and on reservation status and network bandwidth information; and a reservation result transmitting unit which transmits said delivery start time and said delivery end time as delivery reservation result information to said receiving node.

7. A communication terminal apparatus as claimed in claim 6, wherein said delivery time determining unit calculates required delivery time by dividing block size by network bandwidth, measures communication delay time, calculates delivery start time and delivery end time based on said required delivery time, said communication delay time, and said playback start time, and determines final delivery start time and delivery end time, or denies said delivery, by checking said calculated delivery start time and delivery end time against said reservation status.

8. A communication terminal apparatus as claimed in claim 7, wherein said delivery time determining unit has a receiving node priority table, and wherein when priority of said receiving node currently requesting a reservation is compared with priority of any other receiving node whose reservation request has already been accepted, if the priority of said currently requesting receiving node is higher, the reservation request from said currently requesting receiving node is preferentially accepted, and the reservation request from said other receiving node is canceled.

9. A recording medium readable by a computer, said recording medium having a program recorded thereon for causing, in order to receive content in a computer network from at least one delivery node that holds a block allocated thereto from among a plurality of blocks constituting said content, said computer to function as:

a reservation request transmitting unit which transmits playback start time of each block as delivery reservation request information to a corresponding one of said delivery nodes;

a reservation result receiving unit which receives, from said corresponding delivery node, delivery reservation result information carrying delivery start time and delivery end time that said corresponding delivery node has determined based at least on said delivery reservation request information and on reservation status and network bandwidth information; and a block receiving unit which receives said block by requesting, in accordance with said delivery reservation result information, delivery of said block from said corresponding delivery node.

10. A recording medium readable by a computer, said recording medium having a program recorded thereon for causing, in order to hold a block allocated from among a plurality of blocks constituting a piece of content and to deliver said block to a receiving node in a computer network, said computer to function as:

a reservation request receiving unit which receives playback start time of said block as delivery reservation request information from said receiving node;

a delivery time determining unit which determines delivery start time and delivery end time based at least on said delivery reservation request information and on reservation status and network bandwidth information; and a reservation result transmitting unit which transmits said delivery start time and said delivery end time as delivery reservation result information to said receiving node.

* * * * *